United States Patent Office 3,248,367
Patented Apr. 26, 1966

3,248,367
3-MORPHOLINOPROPIOPHENONE
HEXAFLUOROPHOSPHATE
Hugh T. Harrison, Midland, Mich., assignor to The Dow Chemical Company, Midland, Mich., a corporation of Delaware
No Drawing. Filed June 4, 1962, Ser. No. 199,621
1 Claim. (Cl. 260—247.7)

The present invention is directed to the novel compound 3-morpholinopropiophenone hexafluorophosphate. The compound corresponds to the formula:

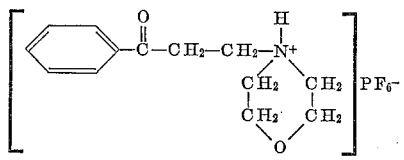

The present compound is a white crystalline material, of low solubility in organic solvents and of moderate solubility in water. It is useful as a parasiticide, and is adapted to be employed as a parasiticide in the control of insects, mites, bacterial and fungal pests such as *Aspergillus terreus*, fire blight, two-spotted spider mite and *Staphylococcus aureus*.

The novel compound can be prepared by reacting together 3-morpholinopropiophenone and hexafluorophosphoric acid. Conveniently, the reaction is carried out in an inert liquid reaction medium, such as water. Good results are obtained when substantially equimolecular proportions of the reactants are employed. The reaction is exothermic and takes place smoothly at temperatures of from 15° to 50° C.

In carrying out the reaction, the 3-morpholinopropiophenone is contacted with the hexafluorophosphoric acid in any conventional manner. The contacting is conveniently carried out by adding one reactant to the other reactant. Oftentimes it is convenient to employ a hydrate form of the acid reactant. The temperature of the resulting reaction medium can be controlled by regulating the rate of the contacting of the reactants as well as by external cooling. Sometimes the desired product precipitates in the mixture during the reaction. Where desirable to maintain fluid condition such product can be in part separated by conventional procedures. Upon completion of the contacting of the reactants, most of the reaction will have taken place with the production of the desired product. Where optimum yields are desired, it is often convenient that the reaction mixture be allowed to stand several hours to insure substantial completion of reaction. Upon completion of the reaction, the solvent can be removed from the reaction mixture by evaporation or distillation under reduced pressure to obtain the salt product as a residue. This production can be further purified by conventional procedures such as washing with water or suitable organic liquid and recrystallization.

In an alternate and preferred method of carrying out the reaction, the hexafluorophosphoric acid is contacted with the hydrochloride of 3-morpholinopropiophenone, preferably in an aqueous reaction medium. The conditions of reaction and methods of preparation and purification are all as previously described.

In a representative operation, 3-morpholinopropiophenone hydrochloride (50 grams; 0.20 mole) is dissolved in about 50 milliliters of water. This solution is then added rapidly portionwise and with stirring to an aqueous 65 percent solution of hexafluorophosphoric acid (equivalent to 32.5 grams; 0.22 mole of $HPF_6$). The aqueous $HPF_6$ solution employed is a commercial product containing 65 percent $HPF_6$, 21 percent $H_2O$, and 14 percent related phosphorus acids. The addition is carried out at room temperature. Upon completion of the addition, the reaction mixture is cooled to a temperature near to 0° C. and subsequently filtered to obtain the crystalline 3-morpholinopropiophenone hexafluorophosphate product as a residue. This product is washed with diethyl ether and the washed product found to melt at from 134° to 134.5°.

The present compound is useful as a parasiticide in various insecticidal, nematocidal and antimicrobicidal compositions. For such use, the unmodified compound can be employed. However, the present invention also encompasses the use of the compound together with a parasiticide adjuvant. In such use, the compound can be dispersed upon a finely divided solid and the resulting preparation employed as a dust. Also, such a mixture can be dispersed in water with the aid of a wetting agent and the resulting aqueous suspension employed as a spray. In other procedures, the product can be employed as a constituent of organic liquid compositions, oil-in-water or water-in-oil emulsions, or water dispersions with or without the addition of wetting, dispersing or emulsifying agents. In representative operations, the subject compound gives substantially complete controls of *Staphylococcus aureus* and *Aspergillus terreus* at concentrations of 500 parts per million by weight.

In further operations, aqueous compositions containing 500 parts by weight of the subject compound per million parts of the composition give substantially complete controls of two-spotted spider mites.

I claim:
3-morpholinopropiophenone hexafluorophosphate.

References Cited by the Examiner
UNITED STATES PATENTS 2,282,907  5/1942  Ter Horst _____ 260—247.7 X
2,957,873  10/1960  Rudner _____ 260—293 X
2,957,876  10/1960  Rudner _____ 260—293 X

OTHER REFERENCES

Downes et al.: "Jour. American Chemical Society," vol. 72, pages 3464–7 (1950).

Van Wazer: "Phosphorus and Its Compounds," vol. I (Chemistry), page 810 (1958), Interscience Pub. Inc., N.Y.

WALTER A. MODANCE, *Primary Examiner.*

NICHOLAS S. RIZZO, *Examiner.*

ROBERT L. PRICE, A. D. SPEVACK,
*Assistant Examiners.*